US005104721A

United States Patent [19]

Sun

[11] Patent Number: 5,104,721

[45] Date of Patent: Apr. 14, 1992

[54] ELECTROPHOTOGRAPHIC PRINTING MEDIA

[75] Inventor: Kang Sun, Coventry, R.I.

[73] Assignee: Arkwright Incorporated, Fiskeville, R.I.

[21] Appl. No.: 479,287

[22] Filed: Feb. 13, 1990

[51] Int. Cl.[5] .............................................. B32B 9/00

[52] U.S. Cl. .................................... 428/206; 428/195; 428/207; 428/323; 428/327; 428/328; 428/411.1; 430/58; 430/59; 430/78

[58] Field of Search ..................... 430/58, 59, 78, 204, 430/206, 207; 428/323, 327, 328, 195, 411.1

[56] References Cited

U.S. PATENT DOCUMENTS

| | | | |
|---|---|---|---|
| 4,071,362 | 1/1978 | Takenaka et al. . | |
| 4,141,729 | 2/1979 | Okazaki et al. | 430/78 |
| 4,192,677 | 3/1980 | Okazaki et al. | 430/59 |
| 4,399,207 | 8/1983 | Sakai et al. | 430/58 |
| 4,489,122 | 11/1984 | Kammin et al. . | |
| 4,529,650 | 7/1985 | Martinez . | |
| 4,621,009 | 11/1986 | Lad . | |

FOREIGN PATENT DOCUMENTS

| | | |
|---|---|---|
| 55-142354 | 11/1980 | Japan . |
| 55-142355 | 11/1980 | Japan . |

*Primary Examiner*—Patrick J. Ryan
*Attorney, Agent, or Firm*—Birch, Stewart, Kolasch & Birch

[57] ABSTRACT

A medium for electrophotographic printing or copying comprising a polymeric substrate coated with a polymeric coating having a Tukon hardness of about 0.5 to 5.0 and a glass transition temperature of about 5° to 45° C., said coating containing at least one pigment which provides a coefficient of static friction of from 0.20 to 0.80 and a coefficient of dynamic friction of from 0.10 to 0.40. The medium of the invention has improved image quality and toner adhesion. It is particularly useful in laser electrophotographic printing.

15 Claims, No Drawings

ELECTROPHOTOGRAPHIC PRINTING MEDIA

BACKGROUND AND FIELD OF THE INVENTION

The present invention relates to media used in electrophotographic printing and more particularly to a plastic sheet or film for use in electrophotographic printing comprised of a transparent or opaque polymeric substrate coated with a polymeric coating having particular hardness and glass transition temperature parameters.

Laser electrophotography is an important electronic non-impact printing technology. It has several advantages over traditional mechanical impact printing techniques, such as high resolution, low noise level and high speed. However, currently available receptor media for laser printers, particularly for desktop laser printers, do not provide satisfactory image quality. They are frequently deficient in toner adhesion and resolution and in providing uniformly dense characters. The present invention overcomes these problems in laser electrophotography. While laser electrophotographic printing is specifically discussed in the present specification, the invention is equally applicable to other exposing radiation such as light emitting diode (LED), liquid crystal shutter (LCS) and the like techniques. The laser electrophotographic process normally creates images on a coated polymeric substrate in five steps: charging, imaging, developing, image transfer and fixing. The individual steps of the process generally include the following:

(1) The electrophotographic process begins when a uniform electric charge is deposited onto a photoconductor drum in the dark;

(2) An electrostatic latent image is then created on the photoconductor by exposing the photoconductor to an oscillating narrow laser beam that is turned on and off digitally;

(3) The photoconductor is then exposed to toner particles, wherein toner particles having the correct polarity adhere to the exposed latent image;

(4) The medium to be printed is then passed between the photoconductor and a transfer corona to cause the toner particles to transfer from the photoconductor to the medium; and (5) The transferred toner particles are then fixed to the medium by one of various procedures known in the art.

The last two steps in the imaging process represent difficult problems in the electrophotographic printing process. Although transfer of toner particles to the receptor layer is primarily driven by electrostatic forces, suitable transfer and fixing of toner particles to the receptor layer depends substantially upon the properties of the receptor medium. First, in order to insure the fidelity of the image transfer, toner particles must interact weakly with the photoconductor and strongly with the medium. Then, the receptor layer must be able to receive the toner particles completely in order to insure good image resolution. Finally, in the fixing process which follows image transfer, the toner particles must have a good affinity to the receptor layer in order to achieve image bonding.

The receptor sheet used in the process must also meet various important criteria. Most importantly, the receptor sheet surfaces must have suitable surface properties to insure reliable transport through the printer.

One of the most common problems in electrophotographic printing involves stoppage or delays resulting from jams due to inappropriate surface properties of the medium. In fact, if the imaging medium does not pass through the printer, none of the other qualities is relevant. Other factors include resistance to tearing and sufficient thermal stability to avoid buckling and loss of planarity.

Although various recording media have been proposed for use with laser electrophotographic printers, none of them has satisfied the substantial need in the art, particularly for laser printers such as the HP LaserJet and Apple LaserWriter. Current commercial laser media have two main drawbacks. First, the toner cannot be transferred fully from the photoconductor to the receptor layer due to poor toner affinity to this layer. Such incomplete toner transfer creates hollow characters and poor image resolution, both of which are considered as being serious quality defects. Secondly, images can also abrade or flake off from the medium because of poor toner adhesion. Other problems relating to imaging, medium handling and aesthetics are also encountered.

SUMMARY OF THE INVENTION

An object of the present invention is to provide a medium which overcomes the above-mentioned drawbacks. Specifically, the invention provides a medium with improved image quality and toner adhesion while retaining reliable transport qualities. These improvements are attained according to the invention by selecting polymers having particular hardness and glass transition temperature parameters. In particular, the polymeric coating or matrix should be designed to have a Tukon hardness in the range of about 0.5 to about 5.0, preferably 1.0 to 4.0, and a glass transition temperature (Tg) in the range of about 5. to about 45° C., preferably 15° to 40° C. Since an increase in the free volume, i.e., the molecular mobility of a polymer, is inversely proportional to the glass transition temperature, a lower glass transition temperature enhances the interaction of toner particles and the surface of the receptor sheet. Reliable feed through the laser printer is also essential and is achieved principally by means of the suitable selection of pigments. Other factors affecting feed reliability are the matrix binder and the conductive materials used as anti-static agents. Suitable solvent selection for the polymeric mixture and use of a surface active agent are important for the formation of uniform coatings free of optical defects, such as streaks, reticulation and mottle.

In a preferred embodiment of the invention, a substrate base is provided with a coating which contains at least one polymer, preferably an acrylic resin, a polyolefin pigment, a styrene-type conductive agent and a hydrocarbon surface active agent.

DETAILED DESCRIPTION OF THE INVENTION

The media for electrophotographic printing according to the invention generally comprise a plastic film substrate (a polymeric substrate) having a coating composition which enhances uniform and efficient image transfer and which promotes the adhesion of toner particles. The coating composition comprises one or more polymers dispersed or dissolved in a suitable vehicle, one or more pigments, and/or an antistatic agent, and/or surface active agent.

Use of pigments to control the surface properties is essential to the design by reducing static, avoiding blocking and promoting slip, while providing suitable friction to help propel the receptor sheet through the printer.

The base or substrate for the media of the invention is a suitable polymeric material base film having suitable transparent and physical characteristics so as to be resistant to tearing and resistant to damage by heat encountered in a printer, particularly in the fixing unit. Suitable polymeric materials for use as the base film substrate are thermoplastic polymers, including polyesters, polysulfones, poly(vinylchloride), poly(vinyl acetate), polycarbonates, polymethylmethacrylate, cellulose esters and others. A polyethylene terephthalate polyester film is a particularly preferred film base. The thickness of the base film is not particularly restricted, but should generally be in the range of about 2 to 10 mils, preferably about 3.0 to about 5.0 mils. The polymeric base or substrate may be pretreated to enhance adhesion of the polymeric coating thereto.

The coating on the base film, according to the invention, normally has the following characteristics:

1. High toner receptivity (chemically and physically).
2. Relatively soft and flexible at the working temperature of the printer.
3. Excellent light and heat stability.
4. Capable of forming an optically uniform, non-tacky and smooth film.
5. Compatibility with antistatic agents.
6. Compatibility with particulate or pigment systems.

Coatings formed from the coating composition of the invention should have a Tukon hardness of about 0.5 to about 5.0, preferably from about 1.0 to about 4.0 and a glass transition temperature of about 5° to about 45° C., preferably from about 15° to about 40°0 C.

Tukon hardness is measured on a Tukon Hardness Tester, Model 300 (Page-Wilson Corporation, Bridgeport, Conn.). Detailed information concerning the test procedures is available in "Tentative Method of Test for Use of the Tukon Hardness Tester, Method No. F5-52", July 11, 1952 (Rohm & Haas Company, Spring House, Penna.).

For Tukon hardness measurements, the coating solutions are coated onto Bonderik 1000 and dried at 50° C. for 45 minutes. The thickness of the resulting film is approximately 0.8 mils.

The glass transition temperature (Tg) is measured by differential scanning colorimetry (DSC) using a DuPont 910 DSC thermal analyzer, calibrated with appropriate standards. The reading and baseline errors from replicate DSC experiments lead to a typical accuracy in Tg of about 2.C. Measurements of heat flow versus temperature are made upon heating in the range of 0° to 200° C. at a heating rate of 20° C./minute. The sample chamber is purged with dry nitrogen. Film-like samples are encapsulated in aluminum DSC cells. The mid-point method, i.e., identification of the maximum in the derivative of heat flow versus temperature curve, is used to obtain Tg data from the measured DSC curves.

The polymers employed in the coating according to the invention can be thermoplastic or thermosetting resins, and are preferably aqueous acrylic emulsions. However, many other polymers or copolymers can be used as long as they meet the above-mentioned criteria. The coating composition should preferably contain from 10% to 35% by weight of the polymer (solids content). The coating composition is applied to the base film in an amount to provide a final dry coat weight of preferably about 1 to 4 grams per square meter of coating, although suitable coatings may be achieved with lesser or greater amounts of coating weight. This provides a dry coating thickness of about 0.05 to 0.5 mils.

Preferred acrylic emulsions useful in the coating composition of the invention are the acrylic resins sold by Rohm & Haas Company under the trademarks Rhoplex, particularly Rhoplex AC-73, HA-12, HA-16, B-15J.

According to a preferred embodiment of the invention, the polymeric coating comprises about 0.1 to about 10% by weight of pigment based on the weight of dry coating.

Pigments that can be used in the coating composition to modify the surface properties of the medium include calcium carbonate, kaolin, aluminum hydroxide, crystalline polyolefins such as polyethylene or polypropylene, polytetrafluoroethylene, silica, and other organic or inorganic pigments. The pigments primarily provide increased abrasion resistance, slip and anti-blocking characteristics.

The surface properties resulting from the addition of pigment are characterized in terms of the coefficient of friction. The coefficients of static friction and of dynamic friction of the receptor layer surface-to-backing should be in the range of from about 0.20 to 0.80 and from about 0.10 to 0.40, respectively.

The coating composition according to the invention may optionally contain conductive agents as anti-static additives. Preferred examples of conductive or anti-static agents used in the invention include sulfonated polystyrene, copolymers of dimethyl diallyl ammonium chloride and diacetone acrylamide, poly(dimethyl diallyl ammonium chloride), quaternary cellulose acetate, quaternary acrylics, copolymers of dimethyl diallyl ammonium chloride and N-methyl acrylamide and other conductive materials known in the art. These conductive agents should be contained in an amount of about 0.1 to about 5% by weight of dry coating such that the surface resistivity of the receiving sheet is usually about $1\times10^7$ to $1\times10^{14}$ ohms/sq. at 50% relative humidity and 20° C.

Surface active agents, such as wetting agents, dispersing agents, defoaming agents and anti-foaming agents, may be incorporated in the coating to improve surface properties and coatability. Both hydrocarbon type and fluorocarbon type surface active agents can be used. Preferred surface active agents are, for example, FC-430 (3M) and Surfynol 104 (Air Products & Chemicals, Inc.).

A curing agent may be used in the coating composition if a crosslinkable resin is employed. Inclusion of a crosslinking agent will improve the strength of the coatings and the heat stability. Selection of an appropriate crosslinking agent depends on the type of resin to be utilized in the coating composition, and suitable crosslinking agents useful with particular resins are per se known in the art. For example, an active nitrogen-containing compound may be used as a crosslinking agent such as the use of methylated melamine with a polyester resin. If included in the composition, the crosslinking agent is generally used in an amount of from about 0.5 to about 30 wt. % of the dried coating.

The side of the receptor sheet which does not bear the toner-receptive coating may need a backing material in order to reduce electrostatic charging and to reduce sheet-to-sheet friction and sticking. The backing may either be a polymeric coating, polymeric film or paper. The coefficient of static friction of the receptor layer surface-to-backing should be in the range of about 0.20 to 0.80, and the coefficient of dynamic friction should be in the range of about 0.10 to 0.40. The coefficient of friction is determined in accordance with ASTM D1894-78.

The coating formulation, which is used for the formation of the polymer coating on the polymeric substrate, generally is an aqueous coating formulation, but an organic solvent such as methanol, ethanol, cellosolve solvent, etc., can be employed in combination with water as the vehicle, if desired. A coalescing agent may be used therein to improve leveling, scrub resistance, gloss, adhesion, and enamel holdout. An organic solvent soluble formulation may also be devised which performs similarly to the aqueous-based systems.

Any of a number of coating methods may be employed to coat the coating composition onto the film base, such as roller coating, wire-bar coating, dip-coating, air-knife coating, slide coating, curtain coating, doctor coating or gravure coating. Such techniques are well known in the art.

Although the film is designed primarily for electrophotographic printers, it may be employed in electrophotographic copiers with similar advantages.

The following Examples are given merely as illustrative of the invention and are not to be considered as limiting.

EXAMPLE I

A coating composition having the following formulation is prepared:

| | |
|---|---|
| Rhoplex HA-12[(1)] (45%) | 35.34 parts |
| Rhoplex B-15J[(1)] (46%) | 14.83 parts |
| Water | 32.75 parts |
| Versa-TL 125[(2)] (6%) | 0.81 parts |
| Cellosolve solvent | 2.99 parts |
| Surfynol 104[(3)] | 0.23 parts |
| Shamrock S-395[(4)] | 0.36 parts |

(1)Acrylic resins sold by Rohm & Haas Company.
(2)Styrene-type conductive agent sold by National Starch & Chemicals Corporation.
(3)Hydrocarbon surface active agent sold by Air Products & Chemicals, Inc.
(4)Polyolefin pigment sold by Shamrock Chemicals Company.

Rhoplex HA-12 and Rhoplex B-15J resins are added to a drum containing water and mixed for 10 minutes. The styrene-type conductive agent (Versa-TL 125) is then added to the drum with agitation.

Dispersing solvent (Cellosolve), hydrocarbon surfactant (Surfynol 104) and polyolefin pigment (Shamrock S-395) are added to a pail and mixed for 30 minutes with a high speed Cowles mixer.

The pigment dispersion is added slowly to the resin mixture with agitation and the resulting coating solution is applied to a poly(ethylene terephthalate) film (ICI United States Inc.). The coating is dried at 120° C. for 2 minutes.

EXAMPLE II

A coating composition having the following formulation is prepared:

| | |
|---|---|
| Rhoplex AC-73[(1)] (46.5%) | 36.46 parts |
| Rhoplex B-15J[(1)] (46%) | 15.62 parts |
| Water | 32.09 parts |

-continued

| | |
|---|---|
| Versa-TL 125 (6%) | 0.74 parts |
| Cellosolve solvent | 2.99 parts |
| Surfynol 104 | 0.23 parts |
| Shamrock S-395 | 0.36 parts |

(1)Acrylic resins sold by Rohm & Haas Company.

Rhoplex AC-73 and Rhoplex B-15J resins are added to a drum containing water and mixed for 10 minutes. The styrene-type conductive agent (Versa-TL 125) is then added to the drum with agitation.

Cellosolve solvent, hydrocarbon surfactant (Surfynol 104) and polyolefin pigment (Shamrock S-395) are added to a pail and mixed for 30 minutes with a high speed Cowles mixer.

The pigment dispersion is added slowly to the mixture containing the resins with agitation. The resulting coating solution is applied to a poly(ethylene terephthalate) film (ICI United States Inc.). The coating is dried at 120° C. for 2 minutes.

EXAMPLE III

A coating composition having the following formulation is prepared:

| | |
|---|---|
| Rhoplex HA-16[(1)] (45.5%) | 38.58 parts |
| Rhoplex B-15J[(1)] (46%) | 9.67 parts |
| Water | 30.25 parts |
| Versa-TL 125 (6%) | 17.67 parts |
| Ammonium hydroxide | 0.42 parts |
| Cellosolve solvent | 2.86 parts |
| Surfynol 104 | 0.22 parts |
| Shamrock S-395 | 0.34 parts |

(1)Acrylic resins sold by Rohm & Haas Company

Rhoplex HA-16 and Rhoplex B-15J resins are added to a drum containing water and mixed for 10 minutes. The styrene-type conductive agent (Versa-TL 125) is then added to the drum with agitation.

Dispersing solvent (Cellosolve), hydrocarbon surfactant (Surfynol 104) and polyolefin pigment (Shamrock S-395) are added to a pail and mixed for 30 minutes with a high speed Cowles mixer.

The pigment dispersion is added slowly to the resin mixture with agitation and the resulting coating solution is applied to a poly(ethylene terephthalate) film (ICI United States Inc.). The coating is dried at 120° C. for 2 minutes.

The films produced in accordance with the foregoing Examples have the following glass transition temperatures and Tukon hardness values.

| Films | Tg | Tukon Hardness (KHN) |
|---|---|---|
| Example I | 16° C. | 1.6 |
| Example II | 37° C. | 2.9 |
| Example III | 34° C. | 3.2 |

All of the coated films of Examples I–III have excellent image quality and toner adhesion when used in an electrophotographic printer. In contrast, a number of currently available commercial films for electrophotographic printing can be used as comparative examples. These films give poor image quality and toner adhesion. Examples of these films are:

| Film | Tg |
|---|---|
| 3M 154 computer graphics film | 123° C. |
| Folex transparencies Folatran X-100 | 120° C. |
| Folex laser film BG-63 | 72° C. |
| Arkwright 694-00-01 film | 58° C. |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A film suitable for use in an electrophotographic imaging process having improved image quality and toner adhesion which comprises a polymeric substrate coated with a polymeric coating having a Tukon hardness of from about 0.5 to about 5.0 and a glass transition temperature of from about 5° C. to about 45° C., said coating containing about 0.1 to 10% by weight of at least one pigment which provides a surface-to-backing coefficient of static friction of from about 0.20 to 0.80 and a coefficient of dynamic friction of from about 0.10 to 0.40 thereto.

2. The film according to claim 1, wherein the polymeric coating comprises at least one acrylic resin.

3. The film according to claim 1, wherein said pigment is a crystalline polyolefin pigment or an inorganic pigment.

4. The film according to claim 3, wherein said pigment is selected from the group consisting of polyethylene, polypropylene and polytetrafluoroethylene.

5. The film according to claim 3, wherein said pigment is selected from the group consisting of calcium carbonate, kaolin, aluminum hydroxide and silica.

6. The film according to claim 1, wherein the polymeric coating further comprises a conductive or anti-static agent selected from the group consisting of sulfonated polystyrene, copolymers of dimethyl diallyl ammonium chloride and diacetone acrylamide, poly(- dimethyl diallyl ammonium chloride), quaternary cellulose acetate, quaternary acrylics and copolymers of dimethyl diallyl ammonium chloride and N-methyl acrylamide.

7. The film according to claim 1, wherein the polymeric coating further comprises a hydrocarbon surface active agent or a fluorocarbon surface active agent.

8. The film according to claim 6, wherein the conductive or anti-static agent in the coating provides a surface resistivity to the medium of about $1\times10^{7}$ to $1\times10^{14}$ ohms/sq. at 50% relative humidity and 20° C.

9. The film according to claim 1, wherein said polymeric substrate is a poly(ethylene terephthalate) film.

10. The film according to claim 1, 2 or 9, wherein the polymeric coating has a Tukon hardness of from 1.0 to 4.0 and a glass transition temperature of from 15° to 40° C.

11. The film according to claim 1, which has a removable backing sheet adhesively adhered to the non-imaging side of the film, said backing sheet being comprised of paper or a polymeric film.

12. The film according to claim 1, which has a polymeric backing, said backing being a polymer coating.

13. A film suitable for use in an electrophotographic imaging process having improved image quality and toner adhesion which comprises a polymeric substrate coated with a polymeric coating having a thickness of about 0.5 to about 5.0 mils, said polymeric coating having a Tukon hardness of about 0.5 to about 5.0 and a glass transition temperature of from about 5° C. to about 45° C., and containing about 0.1 to 10% by weight of at least one pigment which provides a coefficient of static friction of from about 0.20 to 0.80 and a coefficient of dynamic friction of from about 0.10 to 0.40 thereto.

14. The film according to claim 13, wherein the polymeric coating comprises at least one acrylic resin.

15. The film according to claim 13 or claim 14, wherein the polymeric coating has a Tukon hardness of from 1.0 to 4.0 and a glass transition temperature of from 15° to 40° C.

* * * * *